US012731720B2

(12) United States Patent
Yuan et al.

(10) Patent No.: US 12,731,720 B2
(45) Date of Patent: Sep. 8, 2026

(54) FLIPPING COIL FOR WIRELESS POWER TRANSFER

(71) Applicant: Renesas Electronics America Inc., Milpitas, CA (US)

(72) Inventors: Sheng Yuan, Shanghai (CN); Shangfeng Jiang, Chengdu (CN); Weiwei Zhou, Chengdu (CN); Jiangjian Huang, Milpitas, CA (US); Bo Tang, Chengdu (CN); Hulong Zeng, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 788 days.

(21) Appl. No.: 18/043,444

(22) PCT Filed: Feb. 3, 2023

(86) PCT No.: PCT/CN2023/074415

§ 371 (c)(1),
(2) Date: Feb. 28, 2023

(87) PCT Pub. No.: WO2024/159524

PCT Pub. Date: Aug. 8, 2024

(65) Prior Publication Data

US 2025/0079069 A1 Mar. 6, 2025

(51) Int. Cl.

| | |
|---|---|
| ***H01F 41/061*** | (2016.01) |
| ***H01F 27/28*** | (2006.01) |
| ***H01F 41/074*** | (2016.01) |
| ***H02J 50/00*** | (2016.01) |
| ***H02J 50/10*** | (2016.01) |

(52) U.S. Cl.

CPC ....... *H01F 27/2847* (2013.01); *H01F 41/061* (2016.01); *H01F 41/074* (2016.01); *H02J 50/005* (2020.01); *H02J 50/10* (2016.02)

(58) Field of Classification Search

CPC ......... H01F 27/2847; H01F 2027/2857; H01F 2027/2861; H01F 27/2866; H01F 41/061; H01F 41/074

USPC ................................ 336/186, 188, 189, 206

See application file for complete search history.

(56) References Cited

FOREIGN PATENT DOCUMENTS

| | | | |
|---|---|---|---|
| CN | 1201243 | A | 12/1998 |
| CN | 103871719 | A | 6/2014 |
| CN | 113539637 | A | 10/2021 |
| DE | 102017206440 | A1 | 10/2018 |
| JP | 2011009433 | A | 1/2011 |
| JP | 2012243902 | A | 12/2012 |

OTHER PUBLICATIONS

International Search Report dated Jun. 23, 2023 received in PCT Application No. PCT/CN2023/074415.

*Primary Examiner* — Rakesh B Patel

(74) *Attorney, Agent, or Firm* — SCULLY, SCOTT, MURPHY & PRESSER, P.C.

(57) ABSTRACT

Structures, devices, and methods for wireless power transfer systems are described. A structure can include a plurality of strands a plurality arranged into a coil layer. For every fixed interval along a length of the structure, the plurality of strands can be folded at a lateral angle and vertically inverted in response to being folded at the lateral angle. The plurality of strands being folded can cause the plurality of strands to surround a center of the structure in a parallel path.

17 Claims, 6 Drawing Sheets

140
T
222
230
220
232
2T

400

FLIPPING COIL FOR WIRELESS POWER TRANSFER

CROSS-REFERENCE TO RELATED APPLICATION

This application is a national phase entry of PCT International Application No. PCT/CN2023/074415, filed on Feb. 3, 2023. The disclosure of PCT International Application No. PCT/CN2023/074415 is incorporated by reference herein.

BACKGROUND

The present disclosure relates in general to apparatuses and devices including a flipping coil configuration.

Wireless power system can include a transmitter having a transmission coil and a receiver having a receiver coil. The transmission coil and the receiver coil can be brought close to one another to form a transformer that can facilitate inductive transmission of alternating current (AC) power. The transfer of AC power, from the transmitter to the receiver, can facilitate charging of a battery of the device including the receiver.

SUMMARY

In one embodiment, a structure is generally described. A structure can include a plurality of strands a plurality arranged into a coil layer. For every fixed interval along a length of the structure, the plurality of strands can be folded at a lateral angle and vertically inverted in response to being folded at the lateral angle. The plurality of strands being folded can cause the plurality of strands to surround a center of the structure in a parallel path.

In one embodiment, a device is generally described. The device can include a power rectifier configured to rectify alternating current (AC) power into direct current (DC) power. The device can further include a controller connected to the power rectifier. The controller can be configured to control the power rectifier. The device can further include a structure configured to receive the AC power. The structure can include a plurality of strands arranged into a coil layer. For every fixed interval along a length of the structure, the plurality of strands can be folded at a lateral angle and vertically inverted in response to being folded at the lateral angle. The plurality of strands being folded can cause the plurality of strands to surround a center of the structure in a parallel path.

In one embodiment, a method for constructing a coil of a device is generally described. The method can include arranging a plurality of strands in a parallel path. The method can further include, at every fixed point along the parallel path, folding the plurality of strands at a lateral angle to vertically invert the plurality of strands. The folding can cause the plurality of strands to form a loop surrounding a center point.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
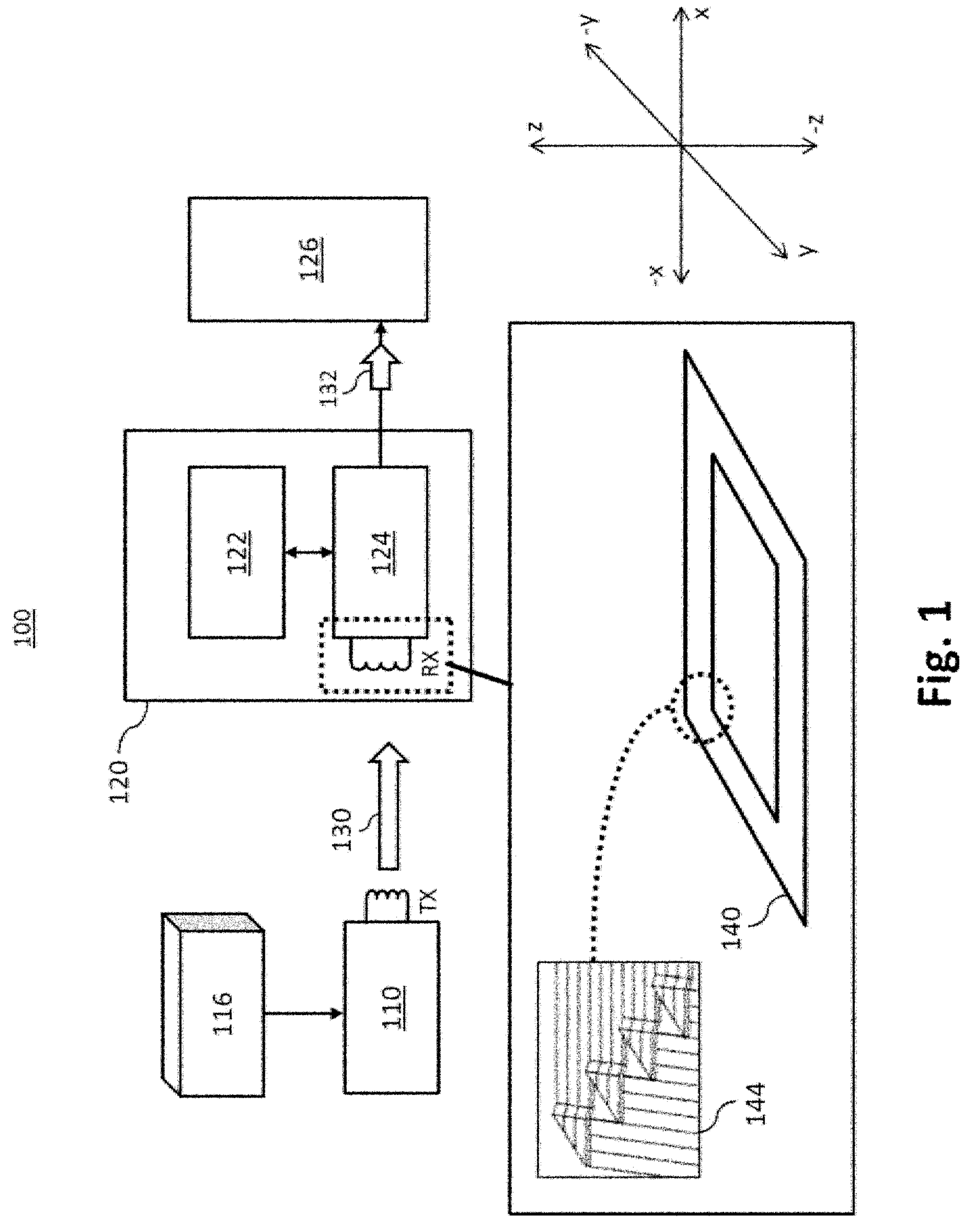
FIG. 1 is a block diagram of an example system for wireless power transfer according to an embodiment.

FIG. 1 is a block diagram of an example system 100 for wireless power transfer according to an embodiment. System 100 can include a transmitter 110 and a receiver 120 that are configured to wirelessly transfer power and data therebetween via inductive coupling. While described herein as transmitter 110 and receiver 120, each of transmitter 110 and receiver 120 may be configured to both transmit and receive power or data therebetween via inductive coupling.

Transmitter 110 is configured to receive power from one or more power supplies and to transmit AC power 130 to receiver 120 wirelessly. For example, transmitter 110 may be configured for connection to a power supply 116 such as, e.g., an adapter or a DC power supply. Transmitter 110 can include a coil TX, and can drive the coil TX to produce a magnetic field. Transmitter 110 can be configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards.

Receiver 120 can be configured to receive AC power 130 transmitted from transmitter 110 and to supply the power to one or more loads 126 or other components of a destination device. Load 126 may comprise, for example, a battery charger that is configured to charge a battery of a destination device, such as a computing device, mobile device, mobile telephone, smart device, tablet, wearable device or any other electronic device that is configured to receive power wirelessly. In an embodiment, the destination device can include receiver 120. In other embodiments, receiver 120 may be separate from the destination device and connected to the destination device via a wire or other component that is configured to provide power to destination device.

Receiver 120 can include a controller 122 and a power rectifier 124. Controller 122 can include, for example, a processor, central processing unit (CPU), field-programmable gate array (FPGA) or any other circuitry that may be configured to control and operate power rectifier 124. Power rectifier 124 includes a coil RX and is configured to rectify power received via coil RX into a power type as needed for load 126. Power rectifier 124 is configured to rectify AC power received from coil RX into DC power 132 which may then be supplied to load 126.

As an example, when receiver 120 is placed in proximity to transmitter 110, the magnetic field produced by coil TX induces a current in coil RX of power rectifier 124. The induced current causes AC power 130 to be inductively transmitted from transmitter 110 to power rectifier 124. Power rectifier 124 receives AC power 130 and converts AC power 130 into DC power 132. DC power 132 is then provided by power rectifier 124 to load 126.

Transmitter 110 and receiver 120 are also configured to exchange information or data, e.g., messages, via the inductive coupling of the power driver of transmitter 110 and power rectifier 124. For example, before transmitter 110 begins transferring power to receiver 120, a power contract may be agreed upon and created between receiver 120 and transmitter 110. In another example, in response to receiver 120 being brought in proximity to transmitter 110, e.g., close enough such that a transformer may be formed by coil TX and coil RX to allow power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120, e.g., if the power contract is already in place. Transmitter 110 and receiver 120 may transmit and receive communication packets, data or other information via the inductive coupling of coil TX and coil RX. In some embodiments, communication between transmitter 110 and receiver 120 can occur before power transfer stage using various protocols such as near field communication (NFC), Bluetooth, etc.

In an aspect, a receiver coil of a wireless power receiver can be constructed using multistrand wires (e.g., Litz wires, or wire including multiple strands). Utilization of multistrand wires can reduce skin depth effect, where skin depth effect is a tendency for alternating electric current (AC) to be displaced from the center of a wire to its surface. The plurality of strands can have different lengths due to the shape of the receiver coil. For example, if the receiver coil includes two strands of wires, such as an inner strand and an outer strand, that are arranged in parallel paths around a center to form a loop (e.g., circular loop, rectangular loop, or other loop shapes), then the inner strand (e.g., strand closer to the center) will be shorter in length, than the outer strand (e.g., strand further from the center). The difference in length can cause the plurality of strands to experience different magnetic flux created by the alternating current created from AC power being received by the receiver coil. For example, the outer strand can experience more magnetic flux than the inner strand due to the outer strand occupying more area of the receiver coil (e.g., longer length). The difference in magnetic flux being experienced by the different size (e.g., different length) strands can cause loop current to be induced between the strands, and this induced loop current can be converted to heat, thus increasing a temperature of the receiver.

A receiver coil configuration for reducing loop current is shown in FIG. 1. The coil RX of receiver 120 can include a plurality of strands (e.g., coils or wires) arranged into a lateral coil layer 140 ("layer 140") on an x-y plane. In one embodiment, coil RX can be a multi-strand coil including a plurality of strands or wires, such as flat rectangular wires or round wires. The plurality of strands can be composed of conductive materials such as copper.

The plurality of strands can be parallel to one another and can span a width of the coil RX. The plurality of strands can be extended in parallel and laterally loop around a center point (e.g., on the x-y plane) such that coil RX can be a loop shape. As the plurality of strands are extended along the parallel path, at predefined fixed intervals along the length of coil RX, the plurality of strands can be folded to form the loop shape of coil RX. The folding can be performed at a lateral angle (e.g., an angle defined on the x-y plane) and the value of the lateral angle can define a loop shape of coil RX. An example in FIG. 1 shows coil RX as a square loop shape, but other shapes are possible (described below).

By way of example, a portion 144 of layer 140 is highlighted in FIG. 1. In portion 144, the plurality of strands can be folded to form a corner of a square loop shaped coil. The folding can cause the plurality of strands to be vertically inverted (e.g., flipped), such that after the fold, top surfaces of the plurality of strands before the fold become bottom surfaces after the fold, and bottom surfaces of the plurality of strands before the fold become top surfaces after the fold. Further, in response to the folding, an innermost strand among the plurality of strands (e.g., closest to the center of coil RX) before the folding can become an outermost strand among the plurality of strands after the folding. Also, in response to the folding, an outermost strand among the plurality of strands (e.g., furthest from the center of coil RX) before the folding can become an innermost strand among the plurality of strands after the folding. At a next fixed point, the plurality of strands can be folded again to flip or vertically invert the plurality of coils once again. The repeated flipping can allow the plurality of strands forming the coil RX to have equal lengths, thus reducing loop current. In an aspect, multi-strand coils such as coil RX can reduce skin depth effect, but having multiple strands of wires with different lengths can increase loop current. Hence, coil RX (or other receiver coils described herein) having multiple strands of wires with identical lengths can reduce skin depth effect and loop current.

Figure 2A:
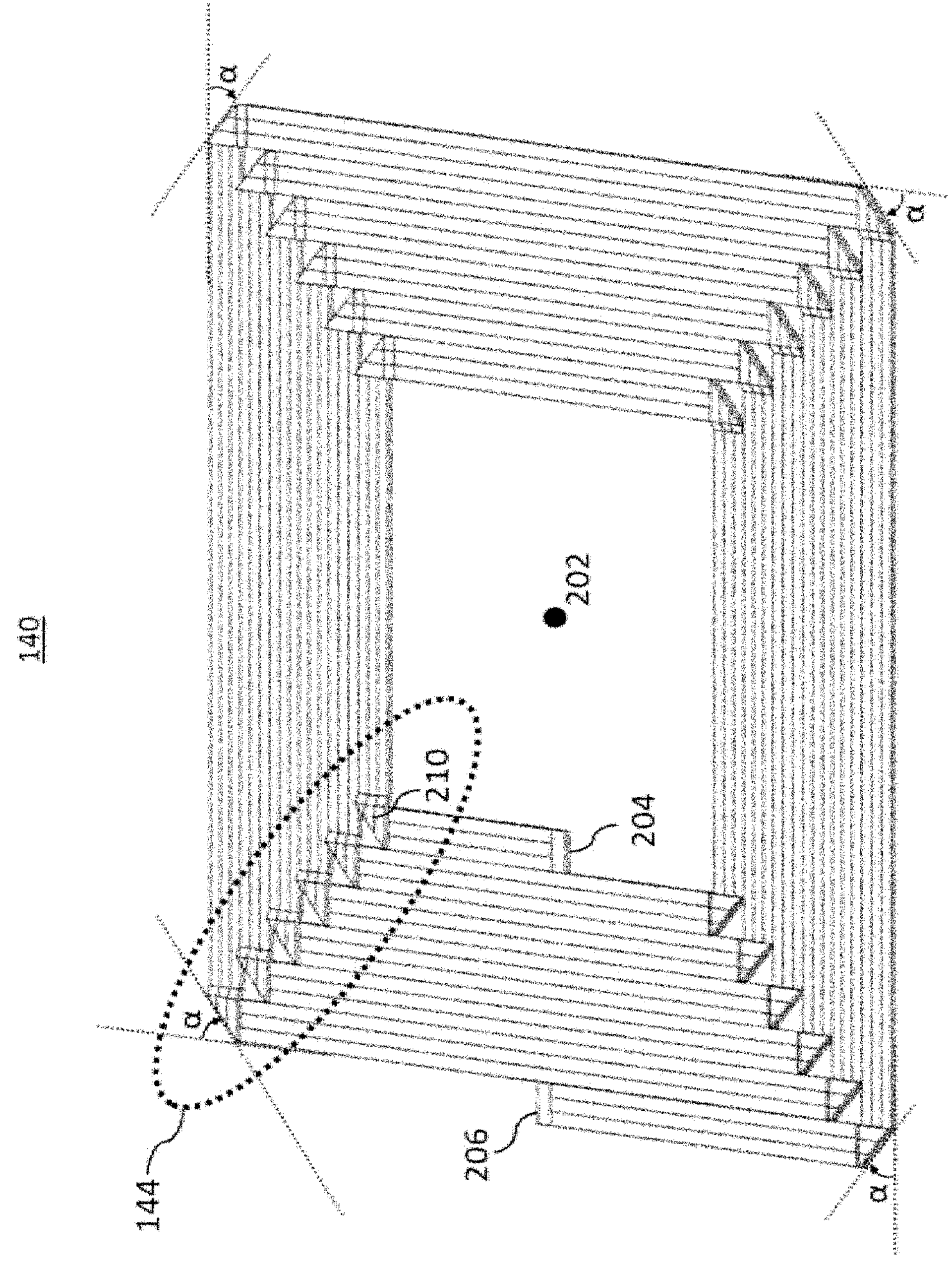
FIG. 2A is a diagram showing components of a receiver that can implement flipping coil for wireless power transfer in one embodiment.
Figure 2B:
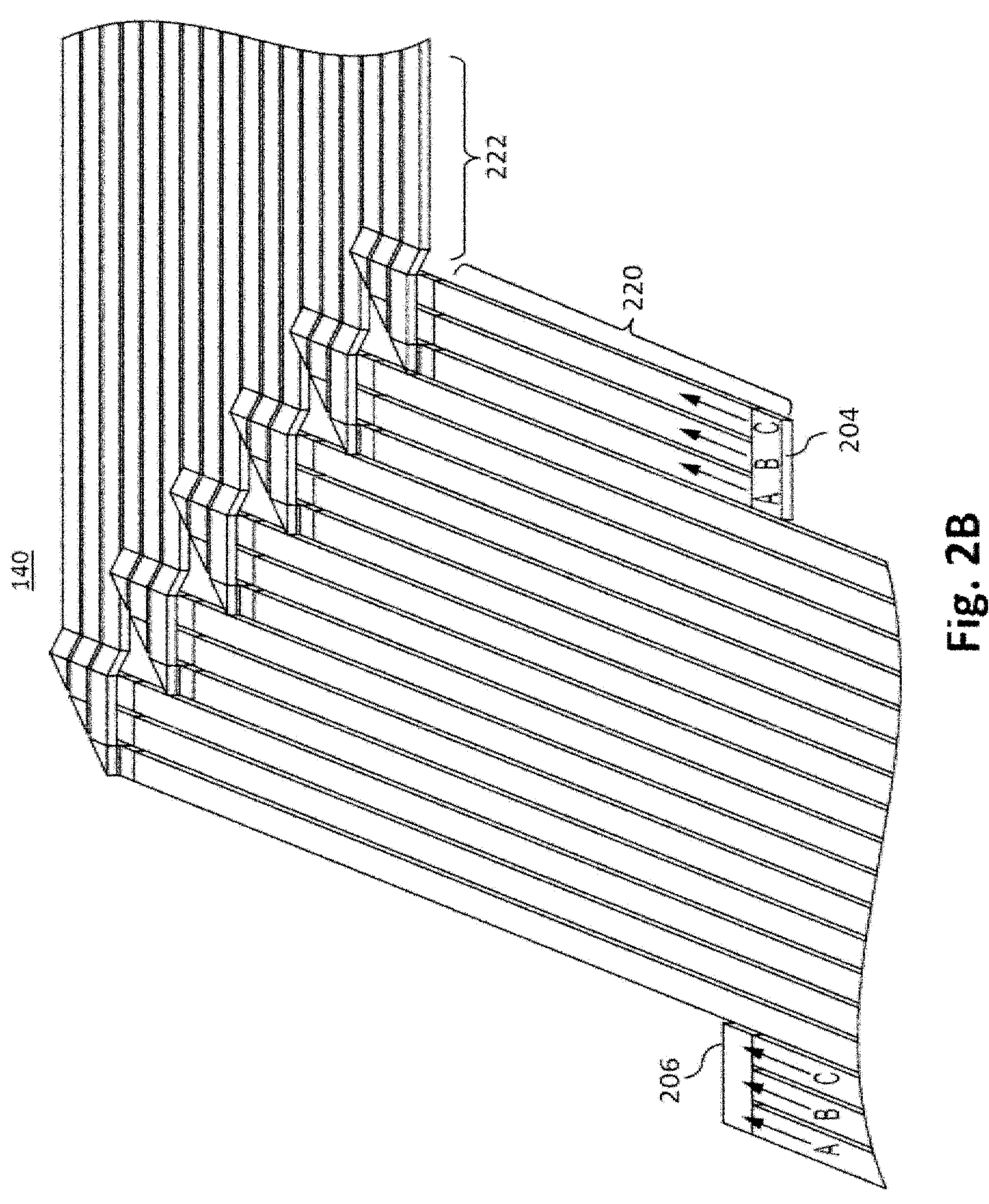
FIG. 2B is another diagram showing components of a receiver that can implement flipping coil for wireless power transfer in one embodiment.
Figure 2C:
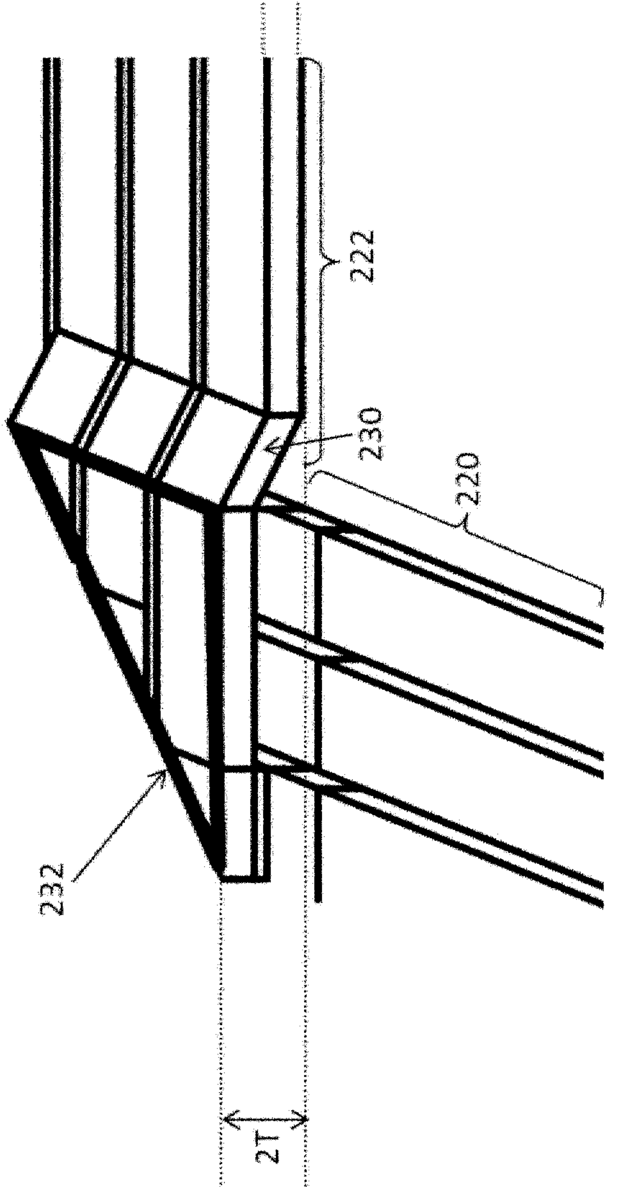
FIG. 2C is another diagram showing components of a receiver that can implement flipping coil for wireless power transfer in one embodiment.

FIGS. 2A, 2B, and 2C are diagrams showing components of a receiver that can implement flipping coil for wireless power transfer in one embodiment. Layer 140 of coil RX (of FIG. 1) is shown in FIG. 2A. In an embodiment shown in FIG. 2A, a plurality of strands, including three strands, can form the coil RX. The plurality of strands can be extended along a parallel path that surrounds a center point or center 202. The layer 140 shown in FIG. 2A has a square loop shape, and the plurality of strands are folded at an angle of a with respect to a longitudinal direction of the plurality of strands. The angle $\alpha$ can be a lateral angle, or an angle on the x-y plane where layer 140 is laid on (see FIG. 1).

To form the coil RX shown in FIG. 2A, a connector 204 can be a starting point and the plurality of strands can be connected at connector 204. The plurality of strands can loop outward, or away from center 202, towards another connector 206 and the coil loop ends at connector 206. At a first fixed point 210, the plurality of strands can be folded at angle $\alpha$ towards center 202 such that the plurality of strands can be flipped or vertically inverted. In one embodiment, to form the square shape loop coil as shown in FIG. 2A, the plurality of strands can be folded at every 90 degrees surrounding center 202. In another embodiment, the plurality of strands can be folded for every fixed length in the innermost loop (e.g., the loop of the coil closest to center 202), then for the loops outside of the innermost loop, the plurality of strands can be folded at corners (e.g., every 90 degrees).

In an example shown in FIG. 2B, a plurality of strands labeled as A, B, C are shown. At connector 204, which can be the starting point to form a loop, strand A is the outermost strand (e.g., further away from center 202 in FIG. 2A among strands A, B, C) and strand C is the innermost strand (e.g., closest to center 202 in FIG. 2A among strands A, B, C). After being folded at angle α at fixed point 210, a portion 222 of strands A, B, C can extend at a direction perpendicular to an original portion 220 of strands A, B, C. Further, after being folded at angle α at fixed point 210 (see FIG. 2A), strands A, B, C can be vertically inverted, or flipped, such that top surfaces of portion 220 of strands A, B, C can become bottom surfaces of portion 222 of strands A, B, C. Furthermore, after being folded at angle α at fixed point 210, outermost strand A in portion 220 can become the innermost strand in portion 222, and innermost strand C in portion 220 can become the outermost strand in portion 222. Note that since the plurality of strands are three in the example shown in FIG. 2B, the middle strand, which is strand B, can remain as the middle strand after folding and flipping. Hence, for odd number of strands, the middle strand can remain as the middle strand, whereas for even number of strands, the middle two strands can be switched after each flip. The repeated flipping can allow the plurality of strands to have equal lengths, thus reducing loop current.

In an example shown in FIG. 2C, a thickness of the plurality of strands can be denoted as T. When the plurality of strands are folded at angle α, the plurality of strands can be pressed down, as shown at portion 230, such that portions 220, 222 can remain on the same plane. Further, as a result of the folding and flipping, a thickness at a folded portion 232 (e.g., a triangular shape portion) can have the plurality of strands overlapping with itself, causing the portion 232 to have a thickness of 2T. In one embodiment, the connectors 204, 206 (see FIG. 2A and FIG. 2B) can have thickness greater than T but less than 2T. The increase of thickness to 2T may have minimal impact on an overall thickness of the receiver coil.

Figure 3:
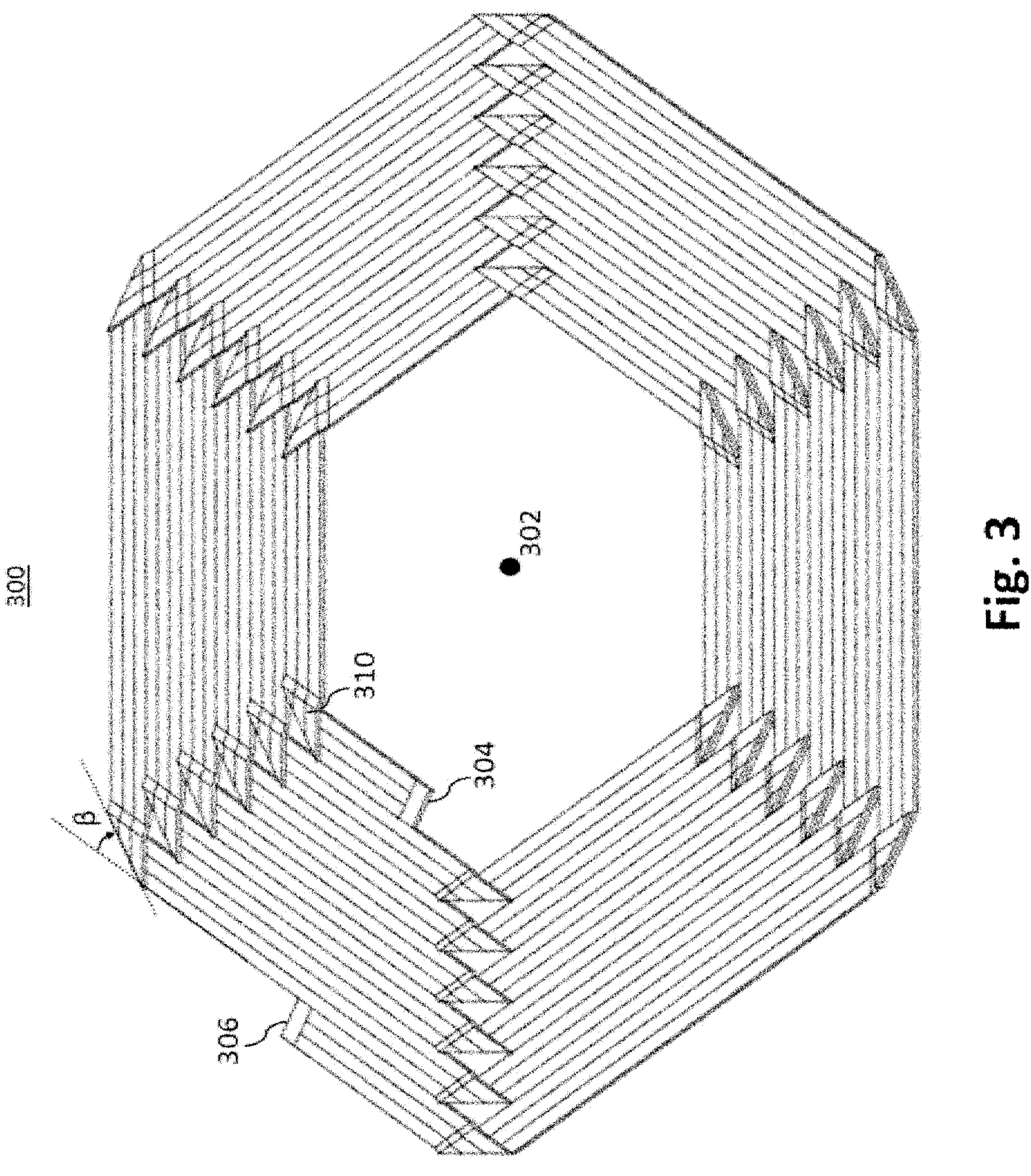
FIG. 3 is a diagram showing a perspective view of an example receiver coil that can implement flipping coil for wireless power transfer in one embodiment.

FIG. 3 is a diagram showing a perspective view of an example receiver coil that can implement flipping coil for wireless power transfer in one embodiment. A receiver coil 300 shown in FIG. 3 can implement coil RX shown in FIG. 1. Receiver coil 300 can include one layer of coil, such as layer 140 described herein. Receiver coil 300 can be a multi-strand coil including a plurality of strands or wires, such as flat rectangular wires or round wires. The plurality of strands forming receiver coil 300 can be composed of conductive materials such as copper. In the example shown in FIG. 3, receiver coil 300 can form a hexagonal loop around a center point or center 302.

In an embodiment shown in FIG. 3, receiver coil 300 can be formed using three strands. The plurality of strands can be extended along a parallel path that surrounds center point 302. The plurality of strands are folded at an angle β with respect to a longitudinal direction of the plurality of strands. The angle β can be a lateral angle, or an angle on the x-y plane (see FIG. 1) where receiver 300 laid on. To form receiver coil 300, a connector 304 can be a starting point and the plurality of strands can be connected at connector 304. The plurality of strands can loop outward, or away from center 302, towards another connector 306 and the loop of receiver coil 300 ends at connector 306. At a first fixed point 310, the plurality of strands can be folded at angle β towards center 302 such that the plurality of strands can be flipped or vertically inverted. In one embodiment, to form the hexagonal shape receiver coil 300, the plurality of strands can be folded at every 60 degrees surrounding center 302.

After being folded at angle β at fixed point 310, the plurality of strands can be vertically inverted, or flipped, such that top surfaces of the plurality strands before the folding become bottom surfaces of the plurality of strands after the folding, and bottom surfaces of the plurality strands before the folding become top surfaces of the plurality of strands after the folding. Further, after being folded at angle β at fixed point 310, the outermost strand before the folding can become the innermost strand after the folding, and the innermost strand before the folding can become the outermost strand after the folding. The repeated flipping can allow the plurality of strands to have equal lengths, thus reducing skin depth effect.

Figure 4:
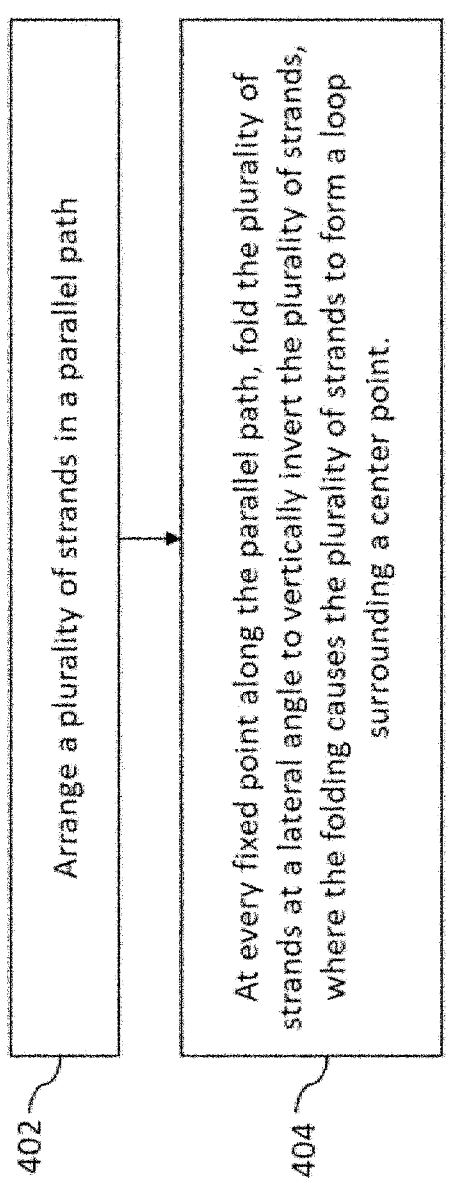
FIG. 4 is a flow diagram illustrating a process of constructing flipping coil for wireless power transfer in one embodiment.

FIG. 4 is a flow diagram illustrating a process of constructing flipping coil for wireless power transfer in one embodiment. The process can include one or more operations, actions, or functions as illustrated by one or more of blocks 402 and/or 404. Although illustrated as discrete blocks, various blocks can be divided into additional blocks, combined into fewer blocks, eliminated, performed in different order, or performed in parallel, depending on the desired implementation.

Process 400 can be performed for constructing a coil of a device, such as a receiver coil of a wireless power receiver. Process 400 can begin at block 402. At block 402, a plurality of strands can be arranged in a parallel path. In one embodiment, the plurality of strands can form a multi-strand wires. In one embodiment, the plurality of strands can be flat rectangular wires. In one embodiment, the plurality of strands can have the same length.

Process 400 can proceed from block 402 to block 404. At block 404, at every fixed point along the parallel path, the plurality of strands can be folded at a lateral angle to vertically invert the plurality of strands. The folding can cause the plurality of strands to form a loop surrounding a center point. In one embodiment, a shape of the structure can be based on the lateral angle.

In one embodiment, the folding of the plurality of strands can cause an outermost strand among the plurality of strands to become a new innermost strand among the plurality of strands. The folding of the plurality of strands can also cause an innermost strand among the plurality of strands to become a new outermost strand among the plurality of strands.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A structure comprising:

a plurality of strands arranged into a coil layer, wherein:

the plurality of strands are flat rectangular wires arranged directly adjacent to one another;

for every fixed interval along a length of the structure, the plurality of strands are folded at a lateral angle and vertically inverted in response to being folded at the lateral angle; and the plurality of strands being folded causes the plurality of strands to surround a center of the structure in a parallel path.

2. The structure of claim 1, wherein the plurality of strands form multi-strand wires.

3. The structure of claim 1, wherein the plurality of strands have the same length.

4. The structure of claim 1, wherein a shape of the structure is based on the lateral angle.

5. The structure of claim 1, wherein the plurality of strands are parts of a wireless power receiver.

6. The structure of claim 1, wherein in response to being folded at the lateral angle:

an outermost strand among the plurality of strands becomes a new innermost strand among the plurality of strands; and an innermost strand among the plurality of strands becomes a new outermost strand among the plurality of strands.

7. A device comprising:

a power rectifier configured to rectify alternating current (AC) power into direct current (DC) power;

a controller connected to the power rectifier, the controller being configured to control the power rectifier;

a structure configured to receive the AC power, the structure including a plurality of strands arranged into a coil layer, wherein:

the plurality of strands are flat rectangular wires arranged directly adjacent to one another;

for every fixed interval along a length of the structure, the plurality of strands are folded at a lateral angle and vertically inverted in response to being folded at the lateral angle; and the plurality of strands being folded causes the plurality of strands to surround a center of the structure in a parallel path.

8. The device of claim 7, wherein in response to being folded at the lateral angle:

an outermost strand among the plurality of strands becomes a new innermost strand among the plurality of strands; and an innermost strand among the plurality of strands becomes a new outermost strand among the plurality of strands.

9. The device of claim 7, wherein the plurality of strands form multi-strand wires.

10. The device of claim 7, wherein the controller, the power rectifier and the structure are parts of a wireless power receiver.

11. The device of claim 7, wherein the plurality of strands have the same length.

12. The device of claim 7, wherein a shape of the structure is based on the lateral angle.

13. A method for constructing a coil of a device, the method comprising:

arranging a plurality of strands in a parallel path, wherein the plurality of strands are flat rectangular wires arranged directly adjacent to one another; and at every fixed point along the parallel path, folding the plurality of strands at a lateral angle to vertically invert the plurality of strands, wherein the folding causes the plurality of strands to form a loop surrounding a center point.

14. The method of claim 13, wherein a shape of the coil is based on the lateral angle.

15. The method of claim 13, wherein folding the plurality of strands comprises:

switching an outermost strand among the plurality of strands into a new innermost strand among the plurality of strands; and switching an innermost strand among the plurality of strands into a new outermost strand among the plurality of strands.

16. The method of claim 13, wherein the plurality of strands form multi-strand wires.

17. The method of claim 13, wherein the plurality of strands have the same length.

* * * * *